L. E. WATERMAN.
TONGUE ADJUSTMENT.
APPLICATION FILED JAN. 10, 1914.
1,186,631.
Patented June 13, 1916.
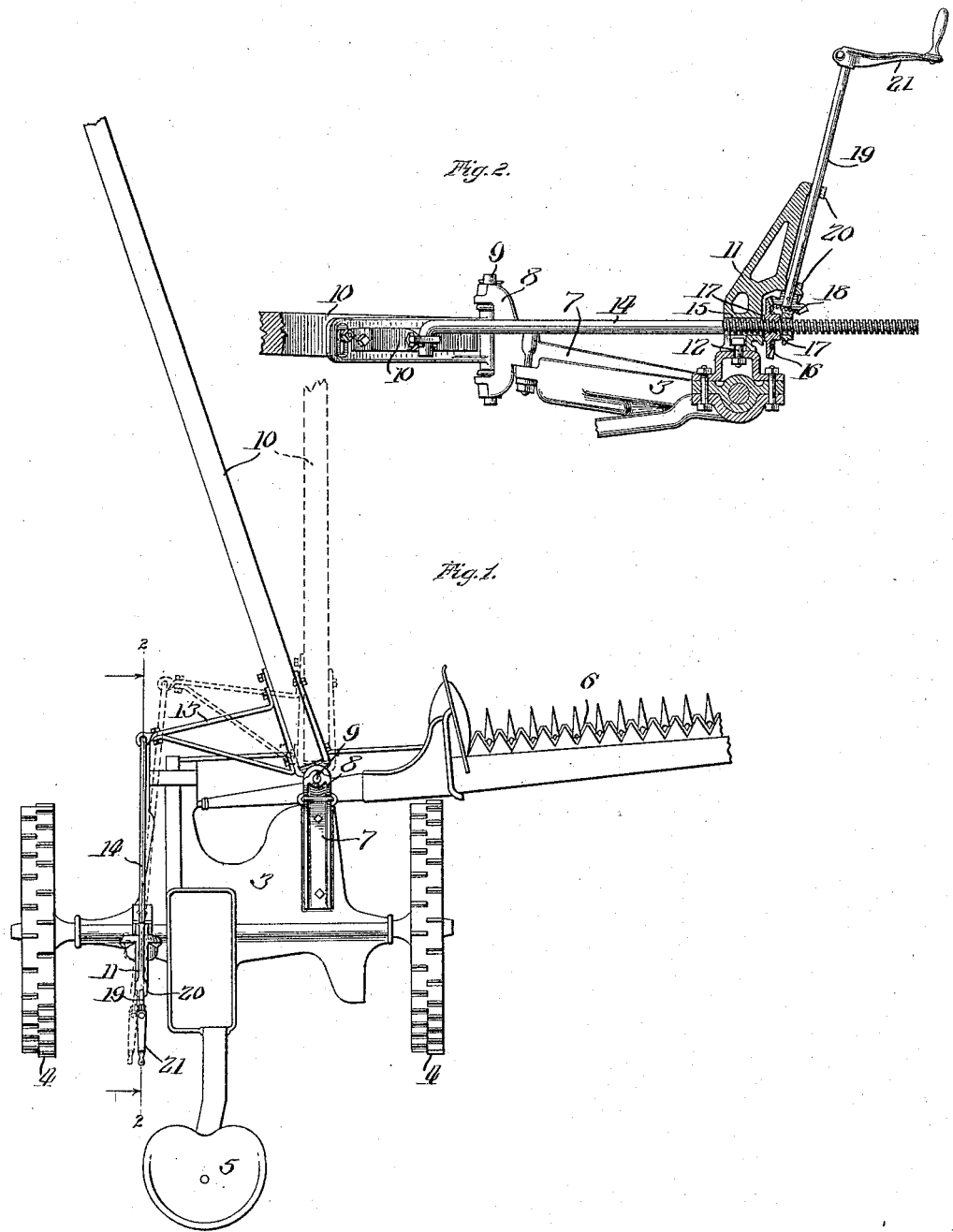

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

TONGUE ADJUSTMENT.

1,186,631. Specification of Letters Patent. Patented June 13, 1916.

Application filed January 10, 1914. Serial No. 811,373.

*To all whom it may concern:*

Be it known that I, LEWIS E. WATERMAN, a citizen of the United States, residing at Rockford, in the county of Winnebago and the State of Illinois, have invented certain new and useful Improvements in Tongue Adjustments, of which the following is a specification.

This invention relates to tongue adjustments such as are adapted for use with agricultural implements hitched in an offset train to a traction engine, the adjustment of the tongue being for the purpose of steering the implement relatively to the line of draft.

The object of my invention is to provide an improved means for adjusting or swinging of the tongue of an agricultural implement laterally relatively to the frame of the implement.

In the accompanying drawings: Figure 1 is a plan view of a mowing machine embodying my improvements, and Fig. 2 is an enlarged vertical sectional view longitudinally through the mower taken on the line 2—2 of Fig. 1.

In the use of agricultural implements such as mowing machines, it is often desirable to hitch a train of mowers to a traction engine, using the mower tongues as the means of connection, each mower being offset laterally from the preceding one, and it is necessary that the mowers be steered individually, which is done by employing separate operable means for swinging the tongues to vary the direction of travel of the mowers relatively to their tongues.

My improvements which are to effect this result comprise an adjustable means anchored to the mower frame by a pivotal mounting and connected to a lateral extension from the tongue, whereby upon adjustment of said means by the operator the tongue may be swung laterally; and since the outer end of the tongue is connected to the tractor or other implement, the tongue will effect lateral movement of the mower.

The mowing machine in which I have illustrated my improvements comprises: a frame 3 carried by wheels 4, a seat 5 carried by the frame, the cutter-bar 6, a bracket 7 bolted to the front end of the frame and having a yoked end 8, the arms of which carry a vertical pivot-bar 9, and a tongue 10 having its rear end pivotally mounted on said pivot-pin 9.

A bracket 11 is rotatably mounted or swiveled on a vertically disposed axis at one side of the tongue mounting, the axis being a bolt 12 which also serves to maintain the said bracket in operable position. The rear end portion of the tongue has a lateral fixed extension or arm 13 which forms with the tongue a bell-crank structure; and a rod 14 is pivotally connected at one end to the outer end of said arm 13 and has its opposite end portion screw-threaded and slidably mounted in an aperture 15 through bracket 11; thus when the said rod is moved lengthwise it swings the tongue laterally upon its pivot 9. A bevel-gear 16 threaded upon the screw-threaded end of rod 14, is held from movement lengthwise thereof by abutting opposite shoulders 17 of the bracket 11, and said gear-wheel is adapted to be rotated to move the rod 14 lengthwise by a bevel-gear 18 which is keyed to a shaft 19 journaled in bearings 20 of the bracket 11, the shaft extending to within reach of an operator on seat 5 and having a crank handle 21 fixed to its outer end.

When the mower is being drawn during operation by a tractor or other implement, the front end of the pole is connected to the implement (not shown), the operable parts of the mower being as shown in Fig. 1 in full lines. When it is desired to alter the course of the mower the operator will turn crank 21 in the desired direction, thus rotating gear 16 which in turn will feed the rod 14 lengthwise and swing the tongue relative to the mower frame, causing the mower to move laterally; and since the pivoted end of rod 14 swings in an arc of which pivot 9 is the center, the bracket 11 will be turned on its pivot 12 by said swinging movement of the rod. The tongue can be adjusted to a straight draft position as shown in dotted lines in Fig. 1, when the mower is to be drawn by horses.

I claim as my invention:

1. In a device of the character set forth, the combination with a vehicle frame, of a tongue pivoted to the frame to swing laterally with respect thereto, said tongue being provided with a lateral extension, a member pivoted to said lateral extension and connected to the frame by a screw and nut connection swiveled on the frame so as to be movable with respect thereto to permit lateral swinging movement of said member, and means for rotating one of the members of said connection.

2. In a vehicle provided with a laterally movable tongue, a member having a screw and nut connection with the vehicle frame, means for rotating one of the members of said connection to move said member longitudinally, and a connection between the forward end of said member and the tongue for moving the tongue laterally upon longitudinal movement of said member, said screw and nut connection being swiveled on the frame to permit the forward end of said member to swing laterally with the tongue.

3. Means for swinging the tongue of a vehicle laterally relative to the vehicle frame comprising, a bracket rotatably mounted on the frame on a vertically disposed axis, a screw-threaded member movable lengthwise of its axis on said bracket, a nut member mounted on said screw-threaded member and held from axial displacement, a connection between said screw-threaded member and the tongue for swinging the tongue laterally through lengthwise movement of the screw-threaded member, and means carried by the bracket for rotating said nut member.

4. In means for swinging the tongue of a vehicle laterally with respect to the vehicle frame, the combination of a bracket swiveled on the frame, a member adjustably mounted on the bracket so as to move with respect thereto in the direction of the line of draft, said member being connected with the tongue for effecting lateral movement thereof by said adjusting movement, and means for adjusting said member.

5. In means for swinging the tongue of a vehicle laterally with respect to the vehicle frame, the combination of a pivoted bracket, means connected to the tongue and connected movably to the bracket for normally maintaining the tongue against lateral movement but adapted to be moved with respect to the bracket to swing the tongue laterally, the bracket being pivotally movable to permit said means to swing laterally with the tongue, and means carried by said bracket and connected with said movable means for moving the same to swing the tongue laterally.

6. In means for swinging the tongue of a vehicle laterally with respect to the vehicle frame, the combination of a bracket swiveled on the frame, a member mounted in the bracket so as to be adjustable with respect thereto in the direction of the line of draft, said member being connected with the tongue for effecting lateral movement thereof by said adjusting movement, and manually operable means mounted on said bracket and connected to said member for moving the same in the direction of the line of draft.

7. The combination with a vehicle having a pivoted tongue capable of lateral swinging movement with respect to the vehicle, of an arm fixedly connected to and extending laterally from the tongue, a member pivotally connected to the outer end of said arm, means including a nut threaded on said member whereby said member is connected to the vehicle frame, a swivel bracket in which said nut is mounted, and means for rotating the nut to impart longitudinal movement to said member.

8. The combination with a vehicle having a pivoted tongue capable of being swung laterally with respect to the frame of the vehicle, of an arm fixedly connected to and extending laterally from the tongue, a rod pivotally connected at its forward end to the outer end of said arm and having its rear end screw-threaded, a nut-member mounted on the rear end of the screw-threaded portion of said rod and held from axial movement, said nut member having a bevel-gear connected therewith, a second bevel-gear meshing with the first named bevel-gear, and means for rotating said second bevel-gear whereby the tongue will be swung laterally.

9. In an agricultural implement, a tongue pivoted on a vertical axis, a member connected at its forward end portion with the tongue for swinging the same on its pivot and connected with the implement frame at a fixed point thereon by means of a pivotally mounted screw and nut connection, means for holding said nut from axial movement, and means operable from the implement for rotating said nut to move the member lengthwise and thereby swing the tongue laterally, the forward end of said member being movable laterally during its lengthwise movement in accordance with the lateral movement of the tongue.

In testimony whereof I have hereunto set my hand in presence of two subscribing witnesses.

LEWIS E. WATERMAN.

Witnesses:

JOHN F. McCANNA,
E. D. E. N. BEHEL.

Copies of this patent may be obtained for five cents each, by addressing the "Commissioner of Patents, Washington, D. C."